United States Patent Office 3,445,090
Patented May 20, 1969

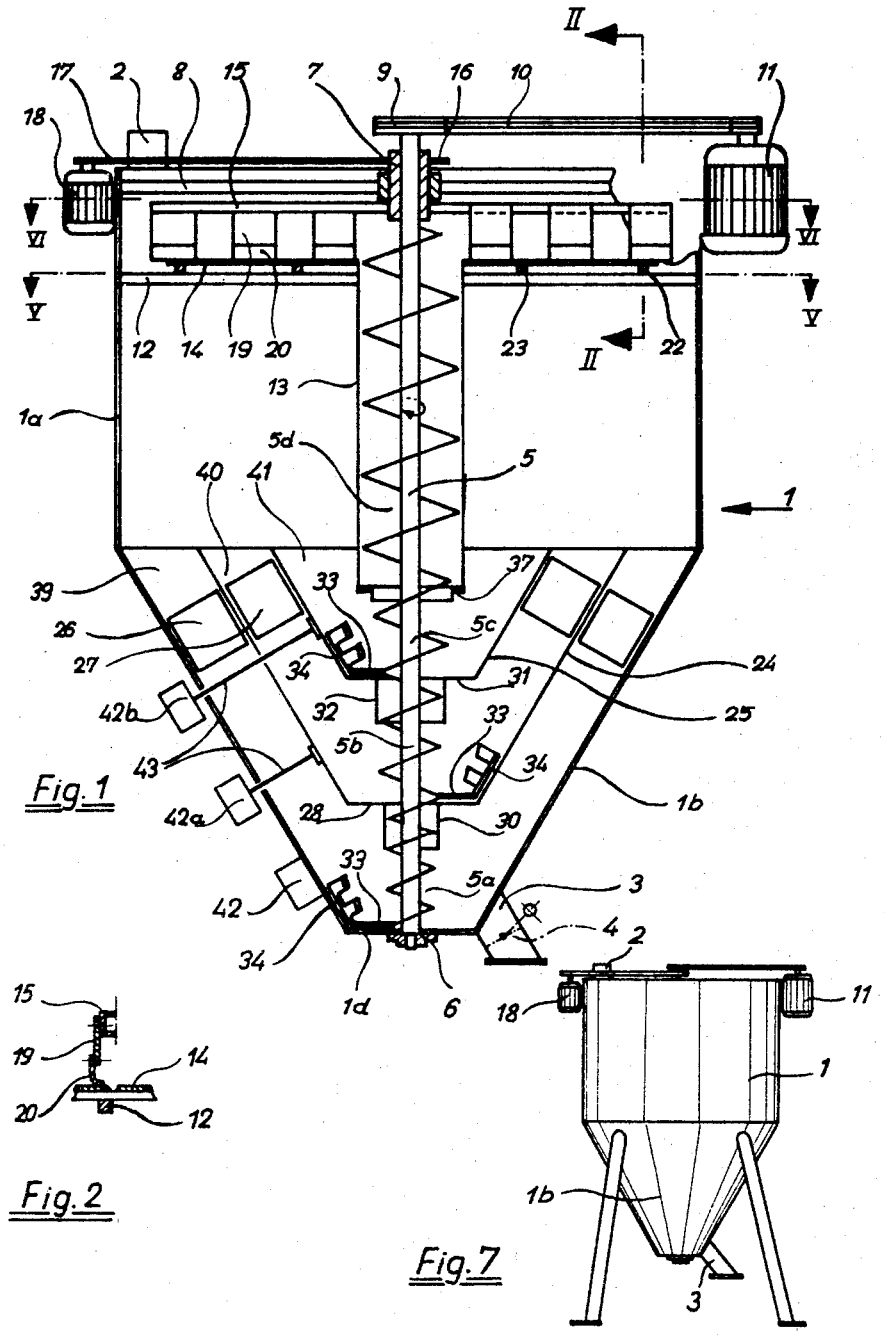

3,445,090
SCREW MIXER
Wilhelm Lodige, Elsener Str. 9c, Fritz Lodige, Leuschnerstr. 12, and Josef Lucke, Im Lohfeld 13, all of Paderborn, Germany
Filed Jan. 29, 1968, Ser. No. 701,222
Claims priority, application Germany, Feb. 4, 1967, L 55,663
Int. Cl. B01f 7/24, 15/02
U.S. Cl. 259—2                                17 Claims

ABSTRACT OF THE DISCLOSURE

A mixer having a vertical vessel with a vertical rotatable worm therein and arms attached to the worm for mixing and feeding descending material to the worm so it can be transported upwardly and deposited onto a distributor whereat the material is also mixed and dropped into the vessel for repeated operation.

Brief summary of the invention

The invention relates to mixers for pourable, pulverized, fine-grained materials, and particularly to mixers having a vertically arranged cylindrical mixing vessel with a conically tapered lower end, there being funnel-shaped conical inserts in the vessel and a centrally arranged conveyor worm partly fitted into a worm tube, the worm extending vertically upwards and having a varying diameter and rotating arms which include a radial portion and a portion extending parallel with the walls of the conical vessel or the insert.

Various screw mixers are known where the conveyor worm runs in a vertical conveyor tube partially surrounding it. Due to the continuous upward conveying of the material to be mixed by means of the worm, there forms at the upper end of the conveyor tube, a conical mound of material. When this mount is built up to the point that the angle of repose of the material is reached, the material subsequently fed, trickles predominantly along the surface of the heap in the direction of the vessel walls. The material to be mixed is taken up by the worm at the lower end of the heap and conveyed upward. The material contained in the heap slides, accordingly, outside the zone of the conveyor worm, so that the individual particles of material to be mixed slowly sink downward without being mixed in the heap.

If in such screw mixers, bulk materials are processed which are not easily pourable and have a more or less strong tendency to form bridges, great compression of the material results, especially in the lower layers of the material, due to the weight of the heap resting on them, in the tapered part of the vessel or respectively on the bottom of the vessel, leading to obstruction of the return flow of material. These obstructions may build up to such a degree that the return flow of the material takes place only from certain parts of the vessel, or a stationary ring of material may form at the vessel casing around the worm as far as the upper part in the cylindrical vessel portion. The dammed-up material no longer participates in the mixing process, or does so only temporarily, if the bridges of mixing material collapse at uncontrollable intervals of time. An attempt has been made to remedy this disadvantage by the use of funnel-shaped inserts and by stirring arms fastened to the conveyor worm, but this has heretofore been unsuccessful in slowly rotating worms.

In other screw mixers with angular or cylindrical upright vessels and vertically arranged worms, material obstructions are avoided by the use of different diameters of the worm from the vessel bottom to the top. This, however, necessitates a high power requirement, so that these known screw mixers can be designed only with small vessel diameters and heights. Today, however, the industry requires mixers of a volume of 100,000 liters, and even at a mixing ratio of 1:50,000 a homogeneous product should be obtainable in the shortest possible time. Positive mixers with horizontal mixing vessels, in which the entire vessel content is maintained in motion by mixing tools, are not suitable for large models for reasons of the required power and consequent high production costs.

It is an object of the invention to provide a screw mixer having a mixing vessel tapered at the lower end in the form of a truncated cone, in which excessive compression of the revolving material and bridge formations are avoided and wherein the mixing accuracy, mixing time, and reliability are improved, so that, for example, twenty successive mixing operations all have the same mixing accuracy.

To achieve this objective it is proposed according to the invention, in a screw mixer of the kind referred to, to form the lower part at the conical vessel as well as the conical insert members with a bottom whose diameter is three times as large as the worm diameter; and additionally to install in the various material circulation stages or mixing chambers formed by the insert members, at a distance from the conveyor worm, in the vicinity of the walls of the conical vessel portion or insert members, specially shaped and arranged devices which displace the sinking materials from the zone at the conical wall in the direction of the open conveyor worm, in order to fill the worm grooves positively; and also to provide at the upper end of the conveyor worm, within the mixing vessel, a distributing and triturating device for the material to be mixed.

Without auxiliary means, a vertically arranged rotating worm becomes filled with the material surrounding it only insufficiently, as the rotating worm edge strongly repels the surrounding material, especially at high speeds of rotation. For improvement there have been installed bent arms which rotate with the worm. These arms fulfill their task only in part and only at very low speeds of rotation, that is, only so long as they do not produce a noticeable centrifugal force in the material in opposite direction.

In slowly rotating worms, the conveying efficiency is very low and insufficient. In order to avoid unduly long mixing times, screw mixers of this kind must, to increase the conveying efficiencies of the conveyor worm, be run at higher speeds of rotation. The material must then be pushed into the worm, which would theoretically be possible by pulsating air cushions at the walls of the conical vessel potrion.

Advantageously there is provided, according to the invention, for the positive filling of the worm, a prolongation on each stirring arm located a small distance above the bottom of the conical vessel portion and each insert part, said prolongation carrying at the end thereof at least one approximately plowshare-shaped worm filling plate. These plates are so formed and arranged that quantities of material are pushed, from the conical wall into the open conveying worm continuously, until filling of the worm is practically complete. The sinking material can then trickle unhindered into the empty spaces created by the worm filling plates at the conical wall, whereby obstructions of material in the regions of stagnation, i.e., at the conical wall, are avoided. The front edges of the carrying or stirring arms, which carry the worm filling plates, are sharpened like knives and are advantageously so formed and arranged that material, such as twine or the like, slides off them outwardly.

A conically downwardly tapered end of a mixing vessel or insert member contributes greatly to the formation of material bridges and consequently to obstructions which interfere with return flow. In order that the vessel or inserts need not be tapered too much downwardly, and to make the individual mixing and circulation stages functionally more efficient, the particular bottom presents a diameter which is twice the size of the outside diameter of the conveying worm at the respective location.

The stirring arms are fastened to the conveying worm just above the bottom of the vessel and the inserts and mix the material sinking to the bottoms, while feeding the material from the conical walls, to the conveyor worm, where the material is received by the worm and conveyed upwards. These stirring arms, which rotate in the inserts in the pressure-relieved part of the vessel, favor the thorough mixing and have only a small power requirement. The bottom in the lower portion of the vessel renders possible an advantageously low structural height of the mixing vessel and a simple attachment of the discharge connection.

If the mixer is equipped with several mixing and circulating stages by the use of a plurality of funnel-shaped inserts, the upward conveying efficiency of the worm starting from each mixing and circulating stage is increased with increased conveying capacity of the worm in upwards direction. For this purpose, the diameter of the worm groove is increased upwardly. In order that the additional material will be accepted by the worm, the worm filling plates must push the material into the enlarged worm in the lower region of each mixing chamber. The material conveyed by the worm in the upper region is then evacuated from different mixing chambers in different quantities, this having a particularly favorable effect on the mixing action.

Since in actual practice, a conveyor worm with worm filling plates is practically completely filled at full working level, there is danger, in the case of certain materials, that especially during the first two minutes of the mixing process when the material is not yet loosened, compressions of the material result within the upper long worm tube which greatly overloads the drive motor and may even stall it completely. To eliminate this danger, it is proposed, especially for long tubes, to give the worm again an increased conveying capacity starting at approximately the lower edge of the surrounding worm tube or to use a worm tube of larger diameter. With the latter arrangement, it is advisable to install in the worm tube, at the lower end, a throttle ring or a short piece of worm tube of smaller diameter.

Advantageously there is to be provided in the mixing vessel, in addition to the funnel-shaped inserts, as has been stated above, a distributing and triturating device for the material to be mixed. This device consists, according to the invention, of a fixed distributor plate at the upper end of the worm and of several stirring arms revolving over this plate and having friction elements cooperating with the distributor plate. Thereby, the upwardly conveyed material is finely divided by trituration and distributed over the entire base area of the vessel, as the stirring arms move the upwardly conveyed material radially outward before it can descend into the mixing vessel through slots or holes in the plate. The mixing action is thus greatly increased, rendering it possible to utilize the gross volume of the mixing vessel approximately 90%.

With the present invention it is possible, for example, in a 5000-liter mixer, in relatively short mixing times (for example 16 minutes) and with quantity differences of the material of 1:50,000, to attain mixing accuracies in sample quantities of 10 g. which far exceed the requirements set by the feed industry.

Comparative tests have shown that in a positive mixer with a horizontally arranged mixing bin filled with 2000 kg. of hog fattening feed, there occurs a power requirement of about 40 HP; whereas a mixer designed according to the invention filled with the same material and the same quantity has a power requirement of only about 13 HP for the two motors of the worm and stirring arms, respectively. As distinguished from the known positive mixers, where the mixing tools maintain practically the entire material in motion, only partial quantities of material are moved by the driven mixing tools in the mixers designed according to the invention. Because of the small power requirement, the costs for the purchase and for the continuous operation of such a mixer are low, so that its use in industry and agriculture is profitable even for materials with low market prices. Because of the low power requirement, mixers designed according to the invention can be built with effective volumes up to 50,000 liters and more. In mixers according to the invention the power requirement peak occurs at a filling degree to just above the lower conical vessel portion. The quantities of material in the upper cylindrical portion no longer have any effect on the power requrement even in the case of high models.

Description of the drawing

FIGURE 1 is an axial section through the mixer;

FIGURE 2 is a section along line II—II in FIG 1, on an enlarged scale;

FIGURE 7 is a side view of the overall mixer.

Detailed Description

Figure 4:
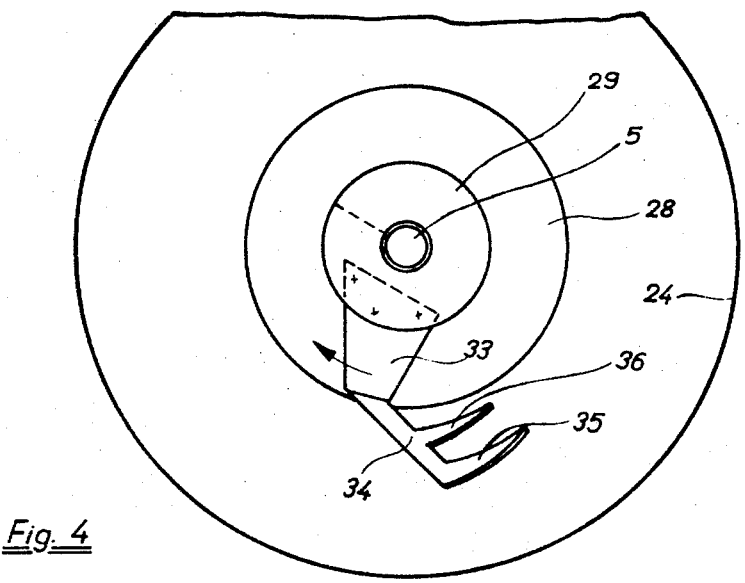
FIGURE 4 is a top plan view of FIG. 3, the worm tube being omitted for simplification.

In the drawing there is shown a mixing vessel which comprises an upper cylindrical portion 1a and a lower truncated conical portion 1b which narrows downwardly. At the top of the vessel there is a supply inlet 2 for the introduction of the material to be mixed, and at the lower end of the vessel, a discharge outlet 3 is arranged for dispensing the material after it has completed its mixing. A throttle valve 4 is disposed in outlet 3 to control the discharge of the material from the vessel.

In the center of the mixing vessel 1 there is disposed a conveyor worm 5 extending substantially the entire height of the vessel. The lower end of the worm 5 is mounted in a bearing 6 secured on the outside of the vessel bottom 1d and the upper end of the worm is mounted in a collar 7. The collar 7 is rotatably held in the vessel 1 by a support frame 8. The upper end of the worm 5 projects from the vessel and carries a pulley 9, which is driven, via a V-belt 10, by a motor 11.

The worm 5 has four different sections 5a, 5b, 5c, 5d with outside diameters increasing upwardly in steps, so that the conveying capacity of the worm vessel increases toward the top.

Below the support frame 8 there is secured in the mixing vessel 1 another support frame 12 which carries a conveying tube 13 surrounding the upper end 5d of worm 5, and a horizontally arranged flat distributor plate 14. The support frames 8, 12 are of open construction and may be constituted by several rods secured to the interior of the vessel portion 1a and the exterior of the collar 7 and the tube 13 respectively. Above the distributor plate 14 there are arranged rotatable distributor arms 15 which are secured to the lower part of the collar. At the upper part of the collar 7, there is mounted a V-belt pulley 16 which is driven via V-belt 17, by an electric motor 18 at a much lower speed than that at which worm 5 is driven. The worm shaft passes through collar 7 and is rotatable in relation to the collar.

On the distributor arms 15 there are secured vertical plates 19, which carry at their lowers ends elastic friction aprons 20 which rest on the distributor plate 14 and which fold over backward upon rotation of the arms 15 in relation to plate 14, as can be seen from FIG. 2.

Figure 5:
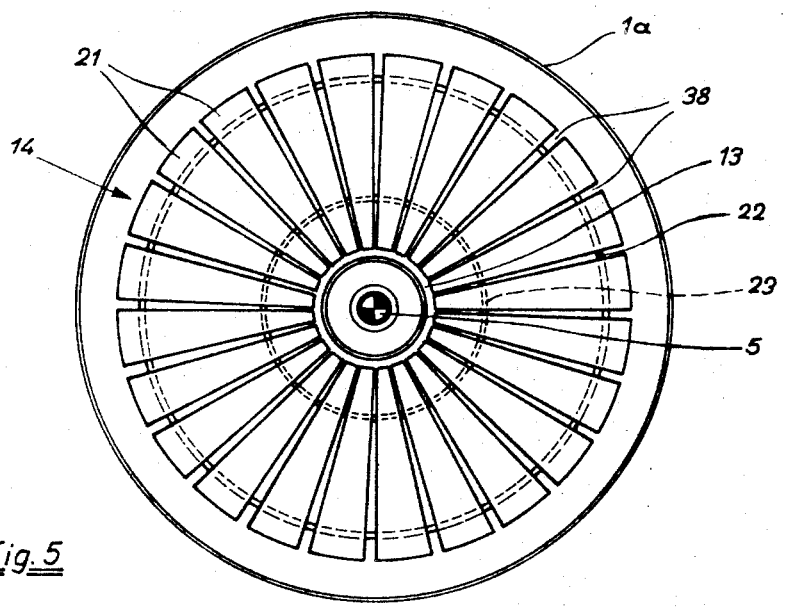
FIGURE 5 is a section taken along line V—V in FIG. 1.
Figure 6:
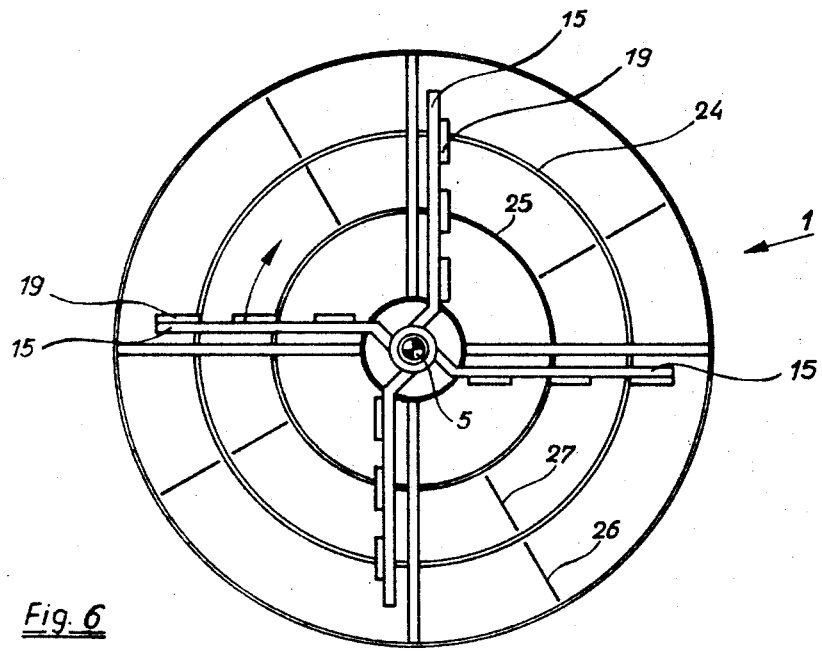
FIGURE 6 is a section taken along line VI—VI in FIG. 1.

As can be seen in particular from FIG. 5, the distributor plate 14 consists of a plurality of spaced segments 21, which are fastened to two rings 22 and 23, which in turn rest on the frame 12. As shown in FIG. 6, four distributor arms 15 are provided; the plates 19 are arranged on successive distributor arms, in offset relation to each other, so that the entire area of the distributor plate (not shown in FIG. 6) is swept by the respective friction aprons 20.

Figure 3:
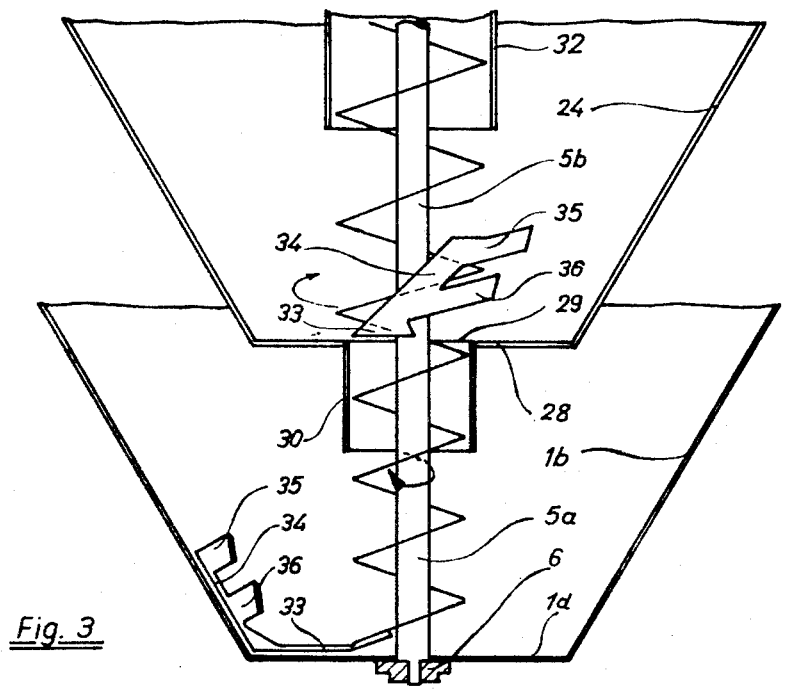
FIGURE 3 is a partial section of FIG. 1 on an enlarged scale.

In the lower conical portion 1b there are provided two funnel-shaped inserts 24 and 25, which are supported by vertical plates 26 and 27 such that the inserts are spaced both from the wall of the portion 1b and from each other. The upper end of the lowest worm part 5a, having the smallest outside diameter, terminates at the lower end of the outer funel-shaped insert 24, so that above the bottom 28 of the funnel-shaped insert 24, the conveying capacity of the worm 5 increases. The bottom 28 possesses a central opening 29 (FIG. 3) for passage of the worm 5, followed by a downwardly directed pipe section 30. The bottom 31 of the inner insert 25 is similarly designed and provided with pipe section 32 surrounding the worm section 5b. At the bottom end of the worm 5, there is secured a flat arm 33 with a knife-like front edge. The arm 33 has an upright bracket 34 extending parallel with the wall of the conial portion 1b, and which, relative to the direction of rotation, slants backward and includes two worm filling plates 35 and 36 extending one above the other extending backwardly and inwardly. The plates 35, 36 lift the material from the wall and push it into the zone of the conveyor worm 5. The diameter of the vessel bottom 1d is two to three times greater than the diameter of the worm 5. At the lower end of each insert 24 and 25, a similar stirring or carrying arm 33 is secured on the worm 5. The filling plates 35 and 36 on the arms 33 are located in a region where there are no pipe sections or conveying tubes between them and the worm 5.

The mixer operates as follows:

The rotary parts turn in the direction of the arrows indicated in the drawing. The material lying on the bottoms 1d, 28 and 31 is intensively mixed by the stirring arms 33, 34 of the revolving worm 5 and in the course of such mixing, the material is pushed by the worm filling plates 35 and 36, in the manner of a plow, just above the particular bottom into the worm. Thus the worm is filled and it conveys the material upwards.

Starting at the bottom of each insert 24, 25 the worm diameter increases, so that the conveying capacity of the worm increases. Moreover, to avoid compression of the material, the worm diameter, above a throttle ring 37, is increased once more at the lower end of the top conveying tube 13.

From tube 13, the material coming from the various circulating stages passes onto the distributor plate 14. The material is engaged by the friction aprons 20 of the stirring arms 15 and displaced radially outward on the plate 14 with simultaneous agitation and in so doing the material is distributed and triturated and pushed through the openings 38 between the segments 21.

The material passes through the openings 38 and falls continuously onto the material present in the vessel. The material piled up below the distributor plate 14 returns to the conveyor worm through annular slots 39, 40 and 41 present between the inserts 24 and 25 and the outer wall of the vessel portion 1b. In the annular slots hardly any pressure is exerted on the mixing material by the material present above it, as the inserts 24 and 25 resist the pressure. Instead, the material descends loosely through the annular slots into the region of the conveyor worm 5, whereat the material is seized and conveyed upwards and the operation is repeated.

The mixer can be quickly emptied substantially completely, through the discharge outlet 3, since the material from the upper inserts trickles through the worm in opposition to the direction of conveyance when the lower mixing chamber is empty, and the lower stirring or carrying arm 33 even throws the last material residues into the discharge outlet.

The flow of the material can be promoted by vibrators or shakers 42, 42a and 42b, which are distributed on the circumference of the vessel portion 1b. Vibrator 42 is intended for promoting flow of the material in the annular slot 39, vibrator 42a for the material in slot 40 and vibrator 42b for the material in slot 41. The vibrators 42a and 42b are connected to inserts 24, 25 respectively by means of rods 43, which are sealed in elastic members in the wall of vessel portion 1b.

What is claimed is:

1. A mixer for pourable, pulverulent material, said mixer comprising a vertical vessel including an upper cylindrical portion, and a lower conically tapering portion, at least one conical insert member in said lower portion defining mixing chambers therein, a vertical conveyor worm arranged centrally in said vessel for transporting material upwardly in the vessel, an inlet for material to be mixed in said upper portion, an outlet for mixed material in said lower portion, said worm including a plurality of successive sections which increase respectively in capacity upwardly, each of said insert members separating successive sections, distributor means in said upper portion for receiving both fresh material from said inlet and transported material from the worm to mix and triturate said material and pass it downwardly, by gravity, in the vessel to said mixing chambers, and means secured to said worm in said lower portion of the vessel at the lower region of each section of the worm for mixing the material and feeding it to the worm, the latter means extending in part parallel to and adjacent the walls of the lower portion of the vessel and each conical insert member to displace the material from the walls and feed it to the worm, said latter means comprising an arm secured to the worm, and a pair of spaced plates on said arm extending rearwards and inwards relative to the direction of rotation of the worm.

2. A mixer as claimed in claim 1, wherein said arm includes an upright portion extending parallel to an associated wall of said insert member or the lower portion of said vessel, said plates being secured to said arm.

3. A mixer as claimed in claim 2, wherein each arm and upright portion has a sharp front edge portion.

4. A mixer as claimed in claim 3, wherein said front edge portion of the arm and upright member extends rearwardly relative to the direction of rotation of the worm.

5. A mixer as claimed in claim 1, wherein said vessel includes a horizontal bottom and each of the insert members includes a horizontal bottom at a change in section of the worm, said arms being mounted horizontally above a respective bottom.

6. A mixer as claimed in claim 5, comprising a pipe section extending downwardly from each bottom of the insert member and surrounding the worm.

7. A mixer as claimed in claim 6, wherein said arm and plates of each mixing and feeding means are arranged adjacent the worm in a region where it is free of said pipe section.

8. A mixer as claimed in claim 7, wherein each plate has the form of a ploughshare.

9. A mixer as claimed in claim 5, wherein the bottom of each said insert member has an opening for the passage of the worm, and said bottom has a diameter which is up to three times the diameter of the worm thereat.

10. A mixer as claimed in claim 1, comprising a tube surrounding the worm in the uppermost section thereof, said uppermost section extending throughout the height of the cylindrical portion.

11. A mixer as claimed in claim 1, comprising bracket means securing each insert in the vessel such that it is spaced from any other inserts and from the walls of the vessel to define annular slots for the downward flow of material.

12. A mixer as claimed in claim 1, comprising vibration means coupled to the walls of the vessel and to each insert member.

13. A mixer as claimed in claim 12, wherein said vibration means comprises external vibrator elements on the vessel and a rod connected to vibrator element and an associated insert member, each rod passing through the wall of the vessel in sealed relation.

14. A mixer as claimed in claim 1, wherein said distributor means comprises a fixed distributor plate, at the upper end of the worm, at least one rotatable stirring arm above said distributor plate and friction elements secured to said stirring arm and in contact with said distributor plate.

15. A mixer as claimed in claim 14, comprising holders secured to each stirring arm and extending downwardly towards said distributor plate, said friction elements being constituted as elastic aprons connected to said holders at the lower ends thereof.

16. A mixer as claimed in claim 15, wherein said distributor plate has openings therein for the passage therethrough of the mixed material.

17. A mixer as claimed in claim 16, wherein said distributor plate is constituted by a plurality of spaced angular segments.

References Cited

UNITED STATES PATENTS

| | | | |
|---|---|---|---|
| 454,323 | 6/1891 | Binau | 259—21 XR |
| 1,268,813 | 6/1918 | Benjamins. | |
| 1,394,371 | 10/1921 | Strauss. | |
| 2,825,511 | 3/1958 | Byberg | 259—97 XR |
| 2,864,593 | 12/1958 | Shoup | 259—97 |
| 3,295,838 | 1/1967 | Ban | 259—2 |

ROBERT W. MICHELL, *Primary Examiner.*

JOHN M. BELL, *Assistant Examiner.*

U.S. Cl. X.R.

241—97; 259—6, 8, 97.